US007444251B2

(12) United States Patent
Nikovski et al.

(10) Patent No.: US 7,444,251 B2
(45) Date of Patent: Oct. 28, 2008

(54) DETECTING AND DIAGNOSING FAULTS IN HVAC EQUIPMENT

(75) Inventors: Daniel N. Nikovski, Cambridge, MA (US); Ajay Divakaran, Woburn, MA (US); Regunathan Radhakrishnan, Pacifica, CA (US); Kadir A. Peker, Muze Mudurlugu (TR)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 193 days.

(21) Appl. No.: 11/498,289

(22) Filed: Aug. 1, 2006

(65) Prior Publication Data
US 2008/0033674 A1    Feb. 7, 2008

(51) Int. Cl.
*G01N 37/00* (2006.01)
*G08B 21/00* (2006.01)
*G05B 9/02* (2006.01)
*G06F 19/00* (2006.01)
*G01D 3/00* (2006.01)
*G01L 25/00* (2006.01)

(52) U.S. Cl. .......................... 702/81; 340/679; 700/79; 700/108; 702/108; 702/113

(58) Field of Classification Search ................. 340/679; 62/126, 127; 702/81, 108, 113; 700/79, 700/108
See application file for complete search history.

(56) References Cited

U.S. PATENT DOCUMENTS

| 6,223,544 | B1 * | 5/2001 | Seem ........................... 62/127 |
| 7,188,482 | B2 * | 3/2007 | Sadegh et al. .................. 62/126 |
| 2004/0267395 | A1 * | 12/2004 | Discenzo et al. ............. 700/99 |
| 2007/0156373 | A1 * | 7/2007 | Yamashita et al. .......... 702/182 |
| 2008/0039993 | A1 * | 2/2008 | Cleary et al. .................. 701/29 |

* cited by examiner

*Primary Examiner*—Jeff Hofsass
*Assistant Examiner*—Jack Wang
(74) *Attorney, Agent, or Firm*—Dirk Brinkman; Clifton D. Mueller; Gene V. Vinokur

(57) ABSTRACT

A method and system detects and diagnoses faults in heating, ventilating and air conditioning (HVAC) equipment. Internal state variables of the HVAC equipment are measured under external driving conditions. Expected internal state variables are predicted for the HVAC equipment operating under the external driving conditions using a locally weighted regression model. Features are determined of the HVAC based on differences between the measured and predicted state variables. The features are classified to determine a condition of the HVAC equipment.

10 Claims, 4 Drawing Sheets

DETECTING AND DIAGNOSING FAULTS IN HVAC EQUIPMENT

FIELD OF THE INVENTION

The present invention relates generally to heating, ventilating and air conditioning (HVAC) equipment, and in particular to methods and systems for detecting and diagnosing faults in such equipment.

BACKGROUND OF THE INVENTION

Heating, ventilating and air conditioning (HVAC) equipment is expensive to install and maintain. Therefore, fault detection and diagnosis (FDD) can reduce costs. Many prior art FDD techniques for HVAC equipment are based on analyzing the equipment after the equipment reaches a steady-state operating condition.

One ruled based expert system senses operating features, such as condensing temperature, evaporating temperature, and condenser inlet temperature. The features are then used to detect and diagnose faults by means of decision rules, Stallard, L. A., "Model based expert system for failure detection and identification of household refrigerators," Master's thesis, School of Mechanical Engineering, Purdue University, West Lafayette, Ind., 1989.

U.S. Pat. No. 6,223,544 issued to Seem on May 1, 2001, "Integrated control and fault detection of HVAC equipment," describes a finite state machine controller for HVAC equipment. That method uses data regarding the equipment performance in a current state, and upon a transition, determines whether a fault condition exists. The fault detection can be based on saturation of the system control, or on a comparison of actual performance to a model of the equipment. As a consequence, the controller does not have to detect steady-state operation to perform fault detection.

Some methods use physical models, such as the ACMODEL, Rossi, T., and Braun, J., "A statistical, rule-based fault detection and diagnostic method for vapor compression air conditioners," International Journal of HVAC Research 3, 19-37, 1997. That method has had limited success. Their accuracy is low. They require detailed mechanical descriptions of the equipment. Their method is not probabilistic. Even if they could produce an accurate estimate of an expected operating state as a function of driving conditions, such estimates are deterministic, and do not show what kind of deviations from an expected state are acceptable and what are not.

For this reason, FDD has turned towards statistical machine learning (SML) models, also known as "black-box models." Such models ignore completely the physical nature of the relationships between driving conditions, device construction, and normal operating states. Instead, those models 'learn' the relationships from data, see Braun, J., and Li, H. "Automated fault detection and diagnosis of rooftop air conditioners for California," Final Report 2.1.6a,b, Purdue University, Mechanical Engineering Dept., 2003, and Zogg, D., "Fault diagnosis for heat pump systems," PhD thesis, Swiss Federal Institute of Technology, Zurich, 2002. In those approaches, fault detection and fault diagnosis are addressed as two separate problems that are solved in sequence by means of two different classes of SML methods.

SUMMARY OF THE INVENTION

The invention provides a system and a method for detecting and diagnosing faults in HVAC equipment. In a first step, a predictive regression model is constructed using locally weighted regression (LWR). The model represents a dependence of internal state variables of the HVAC equipment on external driving influences, under normal operating conditions.

The regression model is obtained from normal training data. The model can predict expected values for the internal state variables, and determines deviations from these values under various abnormal conditions.

A second step detects abnormalities based on deviations (residuals) from normal conditions. An accuracy of the first regression step guarantees success of the method, because the method can disambiguate whether variations in sensed or measured state variables are due to faults or external driving conditions.

DETAILED DESCRIPTION OF THE PREFERRED EMBODIMENT

Figure 1:
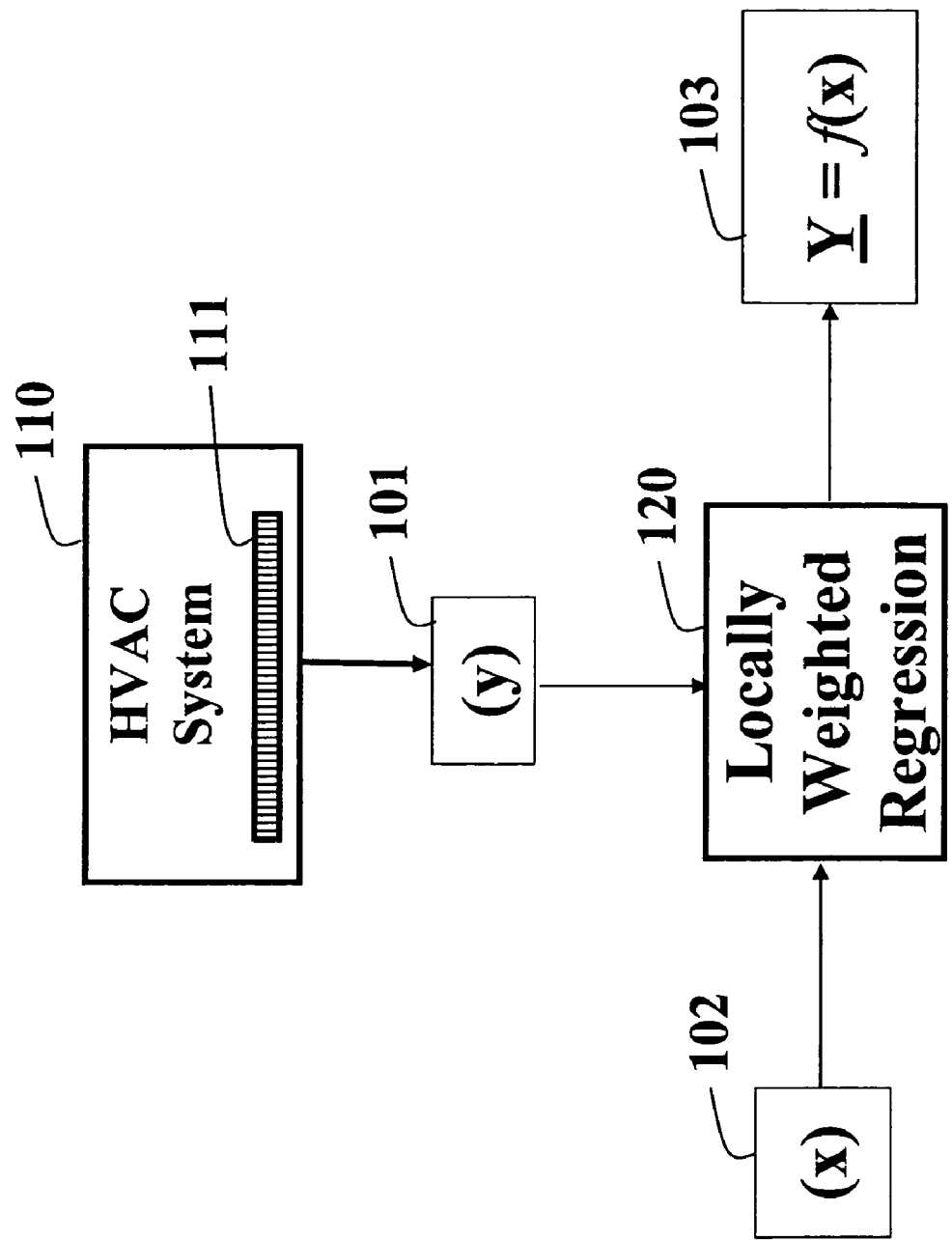
FIG. 1 is a block diagram of a locally weighted regression step according to an embodiment of the invention.

FIG. 1 shows a system and method for detecting and diagnosing faults in heating, ventilating, air conditioning (HVAC) according to an embodiment of the invention.

Fault Detection

A vector $Y=[y_1, y_2, \ldots, y_n]$ 101 stores sampled values or internal state variables $y_i$, $i=1, \ldots, n$ from n sensors 111 arranged in a heating, ventilating, air conditioning (HVAC) equipment 110. Examples of the internal state variables Y for the HVAC equipment are superheat, evaporator temperature, etc. A vector $x=[x_1, x_2, \ldots, x_m]$ 102 stores variables for external driving conditions, e.g., are outside air temperature, humidity, internal room temperature, etc.

Fault detection can be performed using a model $\underline{f}$ 103 that relates the external driving conditions x to operating states $\underline{Y}$: $\underline{Y}=f(x)$. Thus, the fault detection reduces to comparing actual values Y with their expected values $\underline{Y}=f(x)$ for the current external conditions x, and signaling a fault when the differences exceed predetermined thresholds.

However, obtaining the model f 103 for practical HVAC equipment, either analytically or via simulation, is usually extremely difficult, due to the complex thermo-dynamical relationship between the external driving conditions and the construction details of the HVAC equipment.

Fault Classification

After a fault has been detected, it is desired to determine the type of fault by fault classification. A common approach is to base the classification on the differences, i.e., deviations or residuals, $\Delta Y=Y-\underline{Y}$ from the expected normal operating conditions $\underline{Y}$, rather than directly on the actual sensor values Y 101. This corresponds to an assumption that the manifestation of the fault as describes by the differences $\Delta Y$ is largely independent of the actual driving conditions x 102.

A practical consequence from this assumption is that training data can be collected from faulty equipment under a large number of different and known driving conditions x 102, as long as the model f 103 distinguishes correctly Y from x.

From the point of view of statistical machine learning (SML), this step reduces to constructing a classifier from training data. One approach is to construct such a classifier manually, in the form of explicit rules involving the sign of the residuals. An example of such a rule is "if the superheat is higher than normal, and the temperature of the evaporator is lower than normal, and the sub-cooling temperature is lower than normal, then the fault is due to refrigerant leakage." Clearly, such a rule is a simplification because the rule ignores the exact magnitude of the deviations, as well as their mutual dependencies.

In one embodiment, the classifier is constructed by using sensor values from faulty HVAC equipment with correctly diagnosed faults, i.e., known conditions. That is, the sensor values are labeled to indicate specific known faults or conditions. For this embodiment, the classifier 'learns' the function f 103 that maps the vector of differences $\Delta Y$ to a set of discrete class labels, one label for each possible fault. In essence, the classifier learns how to discriminate between differences typical of different known faults. As in the case for the prediction under normal operating conditions, many available SML methods are known.

In practice, a number of SML models can be used for classification, with certain modifications. For example, a linear regression is replaced by a logistic regression, or, if neural nets are to be used for classification, their output units should be sigmoidal rather than linear.

Clearly, the accuracy of the regression step influences directly the success of the classification step. Any modeling errors in the regression step leads to significant residuals in the classification step, and results in incorrect classifiers.

Figure 4:
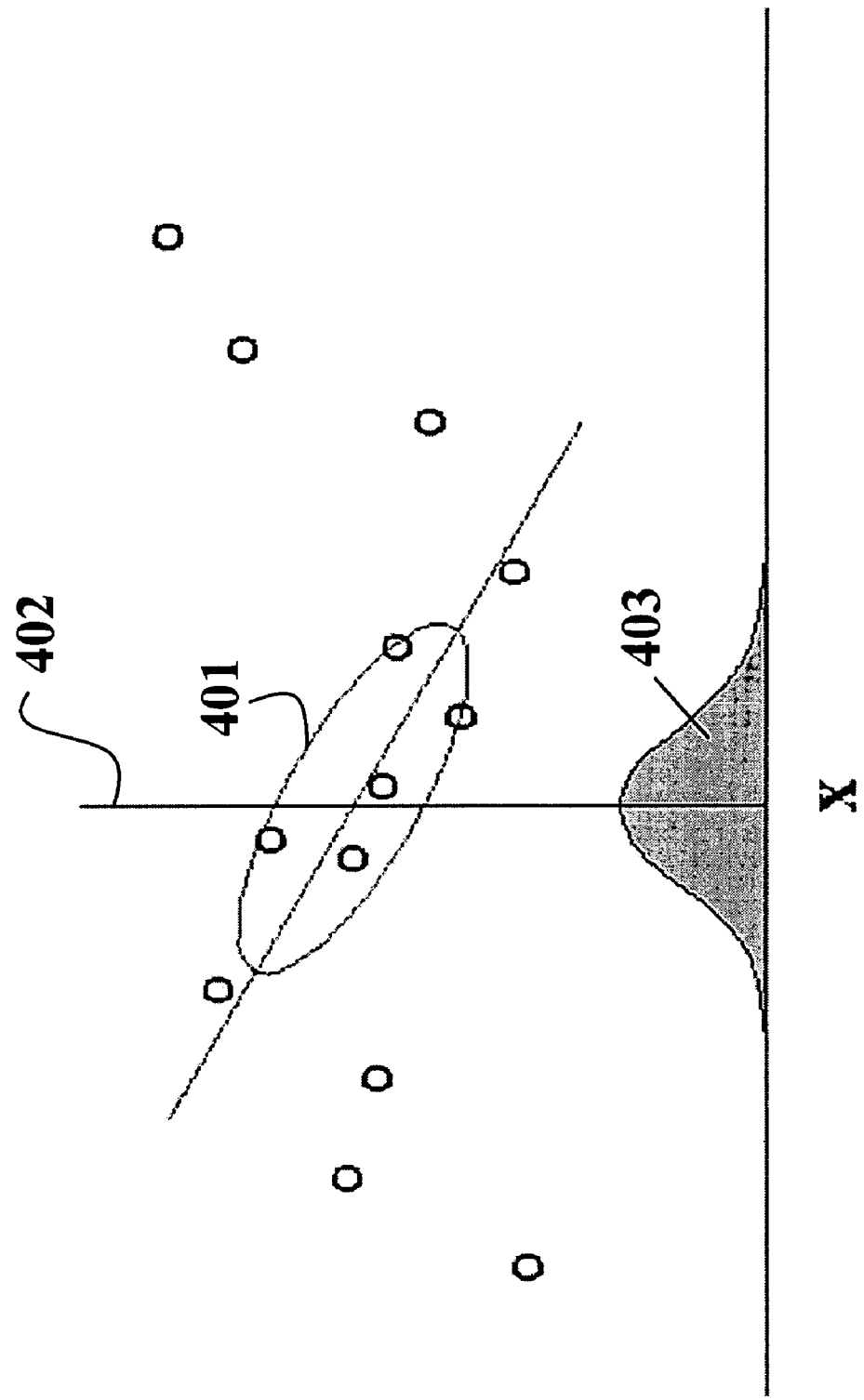
FIG. 4 is a diagram of locally weighted regression according to an embodiment of the invention.

In the preferred embodiment, we use locally weighted regression (LWR) for a local model and polynomial regression for a global model. As shown in FIG. 4, LWR is a memory-based method that performs a regression around a point of interest x 401 using only training data that are local to the point of interest. In locally weighted regression, the data points 401 are weighted by proximity to the current x 402 in question using a kernel 403. A regression is then computed using the weighted points.

Model Construction

FIG. 1 shows the procedure for constructing a model for detecting HVAC faults according to an embodiment of our invention. We learn regression models 120 from data values relating the external driving conditions (x) 102, e.g., outdoor temperature, humidity, and indoor temperature, to the internal state variables 101 of the HVAC equipment 110. Here, Y 101 represents the measured state variables under normal operating conditions of the HVAC equipment, and x 102 represents the input driving conditions.

Given these data, the task of the regression step 120 is to determine the function f(x) 103 such that an objective or cost function, e.g., a mean squared error, which measure a goodness of fit, is optimized. This enables us to predict values of the internal state variables (y) 101 under normal operation of the HVAC equipment 110, given the input conditions x 102.

Such a model can either be local or global. In the local model, such as locally weighted regression (LWR), the training data 'closer' to a query have a greater influence on the model than 'farther' training data. In the global model, such as polynomial regression, all training data have the same influence on the model.

Classifier Training

Figure 2:
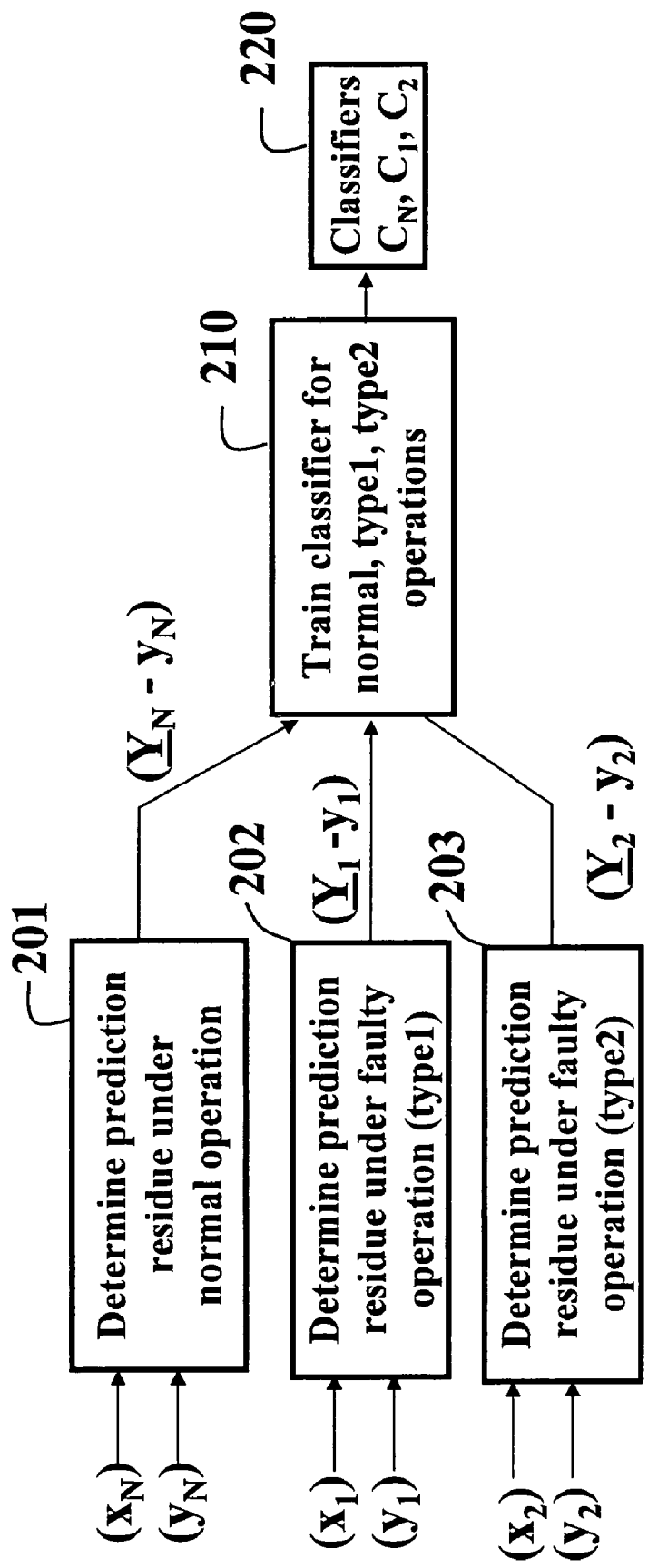
FIG. 2 is a block diagram of a classifier training step according to a preferred embodiment of the invention.

FIG. 2 shows a procedure for training a classifier according to an embodiment of the invention. In this step, we generate prediction residuals based on the regression models and measured values of the internal state variables. Here $x_N$ 102 represent the external driving conditions, and $y_N$ 101 represent the internal state variables while the equipment 110 operates 201 normally. The values $x_1$ and $y_1$ represent the driving conditions and internal state variables while the equipment operates 202 under a first known fault type, e.g., overcharged when detecting an abnormal refrigerant level. The variables $x_2$ and $y_2$ represent the driving conditions and internal variables while the equipment is operates 203 under a second known fault type, e.g., undercharged.

If the HVAC equipment 110 is operating normally, then the difference between the predicted and measured state variables is small and centered around zero. This residual is shown as ($\underline{Y}_N - y_N$). Under faulty conditions, the differences are large and in a certain direction, i.e., positive or negative, depending on the type of fault. The differences under faulty conditions are indicated as ($\underline{Y}_1 - y_1$) and ($\underline{Y}_2 - y_2$), respectively.

Then, we use these prediction residuals as features and train 210 classifiers 220 to distinguish between these three conditions of operation of the equipment, e.g., normal, overcharged and undercharged. The three classes are indicated as $C_N, C_1, C_2$. Obviously, the number of classifiers can match the number of different faults that are detected.

Fault Detection and Diagnosis

Figure 3:
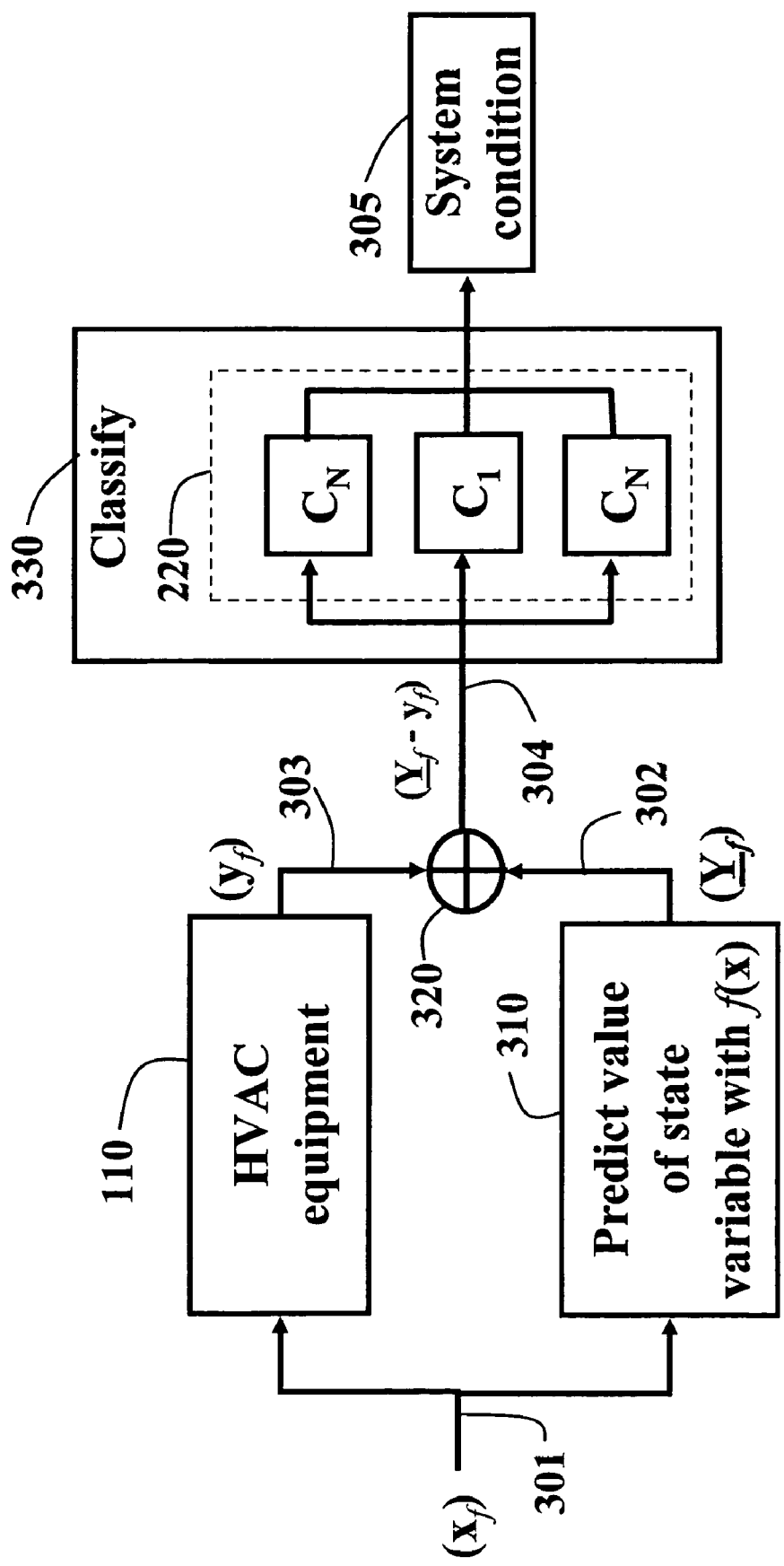
FIG. 3 is a flow diagram of a method for detecting and diagnosing faults in HVAC equipment according to an embodiment of the invention.

After we have completed the constructing and training steps, we can monitor the condition of the HVAC equipment 110 using the method shown in FIG. 3. Using the driving conditions ($x_f$) 301 as input to the regression model (f(x)) 103, we first predict 310 the value of state variables $\underline{Y}_f$ 302. We also have sensor measurements for the internal state variables ($y_f$) 303 from the HVAC equipment 110.

Then, we generate 320 the differences ($\underline{Y}_f - y_f$) 304, and classify 330 using the trained classifiers 220 to determine a condition 305 of the HVAC equipment 110.

EFFECT OF THE INVENTION

The invention provides a system and method for detecting and diagnosing faults in HVAC equipment. The method uses a locally weighted regression step for modeling internal state variables of the HVAC equipment as a function of external driving conditions. The prediction residuals obtained by using the regression step are used as features for training classifiers.

An overall classification accuracy when using prediction residuals from locally weighted regression was found to be about 95%. The classification accuracy for similar data using conventional polynomial regression is about 78%. The locally weighted regression according to the invention is clearly superior to polynomial regression for modeling the state variables as a function of external driving conditions, and is hence is more useful for fault detection and diagnosis in HVAC equipment.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting and diagnosing faults in heating, ventilating and air conditioning (HVAC) equipment, comprising the steps of:

measuring internal state variables of HVAC equipment operating under external driving conditions;

predicting expected internal state variables for the HVAC equipment operating under the external driving conditions using a locally weighted regression model;

determining features of the HVAC based on differences between the measured and predicted state variables; and classifying the features to determine a condition of the HVAC equipment.

2. The method of claim 1, in which locally weighted regression model is constructed by measuring the HVAC equipment operating under normal external driving conditions.

3. The method of claim 1, in which the classifying uses a plurality of classifiers, each classifier trained by measuring the HVAC equipment operating under a known condition.

4. A system for detecting and diagnosing faults in heating, ventilating and air conditioning (HVAC) equipment, comprising the steps of:

sensors configured to measure internal state variables of HVAC equipment operating under external driving conditions;

a locally weighted regression model configured to predict expected internal state variables for the HVAC equipment operating under the external driving conditions using;

means for determining features of the HVAC based on differences between the measured and predicted state variables; and a classifier configured to classify the features to determine a condition of the HVAC equipment.

5. The method of claim 1, in which a regression model uses logistic regression.

6. The method of claim 1, in which the regression model is local.

7. The method of claim 1, in which the regression model is global.

8. The method of claim 1, in which the regression model determines a mean squared error of the regression model is optimized.

9. The method of claim 7, in which the regression model uses polynomial regression.

10. The method of claim 1, in which the classifiers distinguishes between three conditions the equipment.

* * * * *